June 12, 1923.

DE FOREST BYERS

STRAINER

Filed Oct. 29, 1921

1,458,464

WITNESSES

INVENTOR
DeForest Byers,
BY
ATTORNEYS

UNITED STATES PATENT OFFICE.

DE FOREST BYERS, OF CLEAR LAKE, IOWA.

STRAINER.

Application filed October 29, 1921. Serial No. 511,302.

*To all whom it may concern:*

Be it known that I, DE FOREST BYERS, a citizen of the United States, and a resident of Clear Lake, in the county of Cerro Gordo and State of Iowa, have invented certain new and useful Improvements in Strainers, of which the following is a specification.

My present invention relates generally to gasoline straining attachments for internal combustion engines of various characters and in various uses, and is more particularly a strainer which may be readily interposed within the gas supply line, for instance between the supply tank and the carbureter to prevent the passage of dirt and sediment along with the fuel into the carbureter.

My object is the provision of a device of this character which when once installed needs attention only at long intervals and will in use steadily act with a high degree of efficiency.

Figure 1:
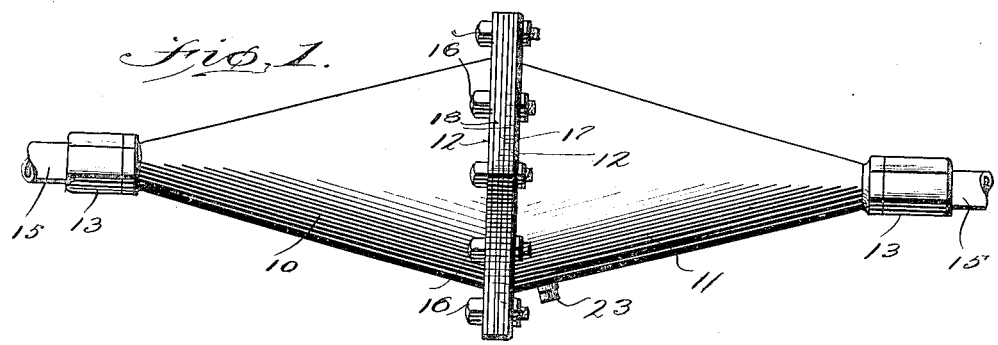
Figure 2:
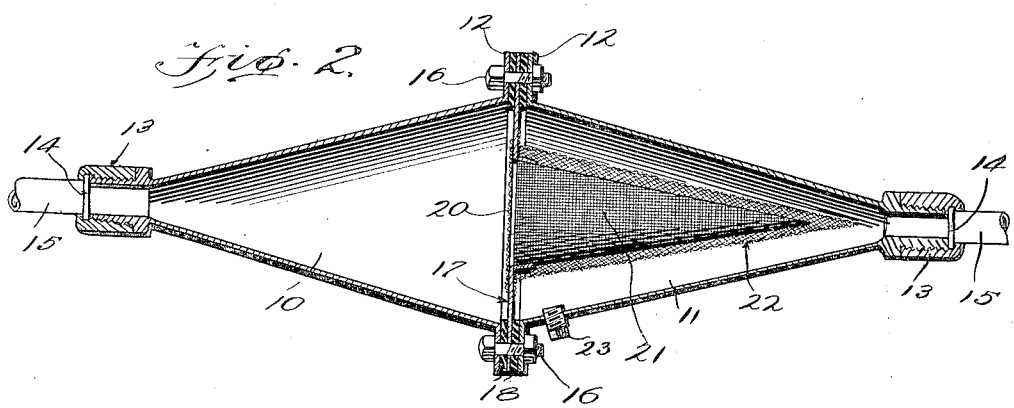
Figure 3:
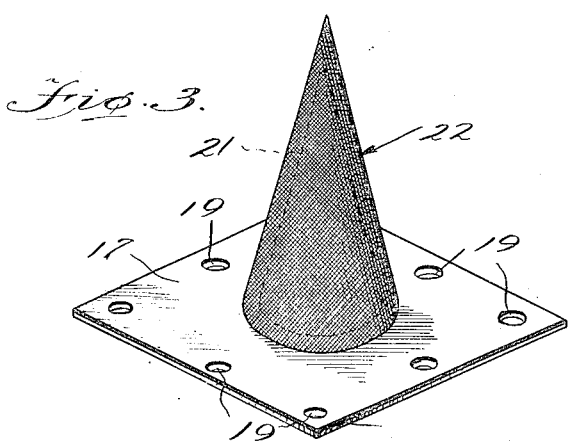

In the accompanying drawing which illustrates my present invention and forms a part of this specification, Figure 1 is a side view, Figure 2 is a vertical longitudinal section, and Figure 3 is a detail perspective view of the strainer plate with the screens carried thereby.

Referring now to these figures I preferably provide a strainer including a two-part casing, each part 10 and 11 being of similar conical form with a flange 12 around its larger open end and with its opposite smaller end externally threaded to receive a flange nut 13 the function of the latter of which is to clampingly connect the adjacent flanged end 14 of one section of the gas feed line 15.

The two parts 10 and 11 of the casing being thus of similar construction, simplifies and effects considerable economy in manufacture, in addition to the added advantage of ready adaptability in use.

Between the flanges 12, the latter of which are connected in use by clamping bolts 16 at spaced points around the casing, the outer portion of a strainer plate 17 is held between packing rings or washers 18 capable of preventing leakage at the joint, strainer plate 17 having openings 19 adjacent to its edge, through which the clamping bolts 16 pass.

The strainer plate 17 has a central opening across which, upon one face of the plate is secured a flat screen 20, the opposite face of the strainer plate having the larger open ends of a pair of spaced apart inner and outer conical screens 21 and 22 secured thereto around its opening, which screens follow in general shape that of the separable parts 10 and 11 of the casing, the larger and outer screen 22 of the pair extending at its apex to a point near the reduced end of one of the casing parts so that on account of the relatively large screening area thus presented, the device as a whole will continue to function properly in use without requiring attention, for instance cleaning, for considerable periods.

This is particularly true if as I propose the strainer is so utilized that the apices of the screening cones are turned in a direction opposite to that of the flow of gasoline or other material in connection with which it is utilized, it being obvious that there will be a tendency of the fluid to wash sediment caught by the screens toward the larger open end of the screens and thus preserve a considerable area of the screens clear at all times for free passage of the gas whereby all danger of clogging is avoided.

It is also contemplated that the part 11 of the casing may be provided with a drain aperture normally closed by the plug 23, so that the water, dirt and the like caught by the screen 22 as well as the particles caught by the screen 21 may be drained from time to time.

I claim:

1. A strainer including a two-part casing of which the parts are of similar conical form and construction, each having a flange around its larger end and tube attaching means at its opposite smaller end, a rigid strainer plate removably clamped between the flanges of the casing parts and reversible therebetween, having a central opening, and conical screen members telescoping one another is spaced apart relation and secured upon one face of said plate around the opening for extension into either part of the casing.

2. A strainer of the character described including a casing, a rigid strainer plate removably mounted in the casing and having a central opening and spaced coaxial screens of conical form secured to the strainer plate one over the other around said opening and extending therefrom in a direction opposite to the flow of fluid through the casing.

DE FOREST BYERS.